United States Patent

Yamanaka

[11] Patent Number: 5,579,950
[45] Date of Patent: Dec. 3, 1996

[54] CONTAINER HAVING EAR AND A METHOD FOR MANUFACTURING THE SAME

[75] Inventor: Nobuo Yamanaka, Tokyo, Japan

[73] Assignee: Yoshino Kogyosho Co., Ltd., Tokyo, Japan

[21] Appl. No.: 211,681

[22] PCT Filed: Aug. 19, 1993

[86] PCT No.: PCT/JP93/01161
§ 371 Date: Jun. 10, 1994
§ 102(e) Date: Jun. 10, 1994

[87] PCT Pub. No.: WO94/04421
PCT Pub. Date: Mar. 3, 1994

[30] Foreign Application Priority Data

Aug. 19, 1992 [JP] Japan ................ 4-063926

[51] Int. Cl.$^6$ .................................. B65D 5/40
[52] U.S. Cl. .............. 220/752; 220/453; 220/461; 229/402
[58] Field of Search ................ 220/752, 453, 220/461, 761, 771; 229/402

[56] References Cited

U.S. PATENT DOCUMENTS

| | | | |
|---|---|---|---|
| D. 129,823 | 10/1941 | Reiber | 229/402 X |
| 2,641,403 | 6/1953 | Buttery et al. | 229/402 |
| 2,867,365 | 1/1959 | Tourette, Jr. | 229/402 X |
| 3,926,361 | 12/1975 | Hilderbrand | 229/402 |
| 4,008,347 | 2/1977 | Amberg et al. | 220/453 X |
| 4,056,221 | 11/1977 | Piltz et al. | 220/461 X |
| 4,284,205 | 8/1981 | Hirata | 220/461 X |
| 4,604,307 | 8/1986 | Spreeuwers | 220/453 X |
| 5,193,711 | 3/1993 | Hirata et al. | 220/453 |
| 5,213,253 | 5/1993 | Fantoni et al. | 229/402 |

Primary Examiner—Steven M. Pollard
Attorney, Agent, or Firm—Oliff & Berridge

[57] ABSTRACT

A container is constructed from a synthetic resin. The containers can be efficiently piled or stacked, since ears provided on the container do not prevent piling. The container includes: a bottom part, a drum part provided at the periphery of the bottom part and at least one ear on the drum part and formed by a kerf. The ear is formed unified with the drum part and can stand up from the drum part. A synthetic resin film covers the kerf in a liquid tight manner over at least the ear forming part of the drum part. The container is designed so the ear can stand in use while the container can pile without projection of the ear before using.

21 Claims, 14 Drawing Sheets

5,579,950

CONTAINER HAVING EAR AND A METHOD FOR MANUFACTURING THE SAME

BACKGROUND OF THE INVENTION

1. Field of the Invention

The present invention relates to a container with an ear. The container is made of a synthetic resin. A method for manufacturing the container is also disclosed and described.

2. Description of the Related Art

Conventionally, a cup-shaped container made of synthetic resin comprises a bottom part and a cylindrical drum part provided on the periphery of the bottom part and an opening at a top surface. Such containers are known to have a unified ear to facilitate handling or have no ear.

A container having an ear is more convenient than the one having no ear because it is easier to carry the container. This facilitates carrying hot contents, such as coffee. However, in the manufacture, transportation, or storage, the container having an ear has the disadvantage in that the ear hinders efficient stacking and piling making the stack bulky. Particularly, in case of a container whose ear projects outwardly, it is very inconvenient to stack the containers. This is especially evident when stacking these containers in an automatic vending machine or when bringing the containers to a picnic.

SUMMARY OF THE INVENTION

It is an object of the invention to provide a container being made of synthetic resin and having an ear. The ear of the present invention allows efficient stacking of the containers. Another object of the invention is to provide a method for manufacturing the container.

According to one embodiment of invention, container comprises a bottom part, a drum part extending upwardly from the periphery of the bottom part, and an ear divided and formed by a kerf. The ear is united with the drum part and is able to extend away from the drum part. A synthetic resin film adheres to the drum part to cover at least the ear forming part while covering the kerf in a liquid tight manner.

Other objects of the invention are achieved by providing the ear able to easily extend away from the drum part. A thin folding line on a boundary between the ear and the drum parts permits easy extension of the ear.

Further, the container can be constructed so the bottom and the drum parts are molded as one piece. The ear is formed on the drum part by providing a kerf on the drum. The synthetic resin film covers over the ear and kerf parts and is adhered to the inside of the drum part in a liquid tight manner.

Another object of the invention can be recognized by constructing the container so the bottom and the drum parts are formed as one piece. The ear is formed on the drum part by providing a kerf on the drum. The synthetic resin film is formed in cylindrical shape and has openings at its top and bottom. The film covers all of the inner surface of the drum part and is adhered to the inner surface of the drum part. In this case, however, the film is not adhered to the ear.

A further object of the invention is achieved by constructing the container so that the bottom and the drum parts are formed as one piece. The ear is formed on the drum part by providing a kerf on the drum. The synthetic resin film is formed in a cylindrical shape and has a bottom and an opening at its top. The film covers all of the inner surface of the drum part and the inner surface of the bottom part and is adhered to the inner surface of the drum.

Furthermore, the container can be constructed so the ear is formed by providing a kerf on the cylindrical drum part. The drum part has openings at its top and bottom. The bottom of a synthetic cylindrically shaped resin film, which has a bottom and an opening on its top, covers all of the inner surface of the drum part and the inner surface of the bottom part.

A further object of the invention is achieved by molding the container in a design including printing a pattern on the periphery of the cylindrically-shaped synthetic resin film and adhering the film to a transparent inner surface of the cylindrical drum part. The film can be formed as multi-layered films. The printed layer can be provided as the intermediate layer of the multi-layered films to form a pattern.

The molding process for the container according to the present invention is described as follows:

First, a die having a cavity for molding the drum part is designed to mold the kerf and the ear simultaneously with the molding of the drum part. The cavity can also be designed to mold the bottom part as one piece with the drum part.

A synthetic resin film is set by inserting the film in the die in advance of the molding. The film is cut in a size to cover the ear and the kerf, and is then set in the die at a position corresponding to the ear. Alternatively, the film can be set in the die after being cylindrically shaped, either with a bottom or without a bottom so as to cover all of the inner surface of the drum part.

Further, a release agent can be coated on the synthetic resin at a position corresponding to the ear-forming part. Alternatively, an ink containing a release agent may be used. In addition, instead of using a release agent, a resin film having no affinity with the drum forming resin may be positioned between the synthetic resin film at a position corresponding to the ear and the drum part.

A molten resin is injected from a blender into the die. The synthetic resin film is set by an injection molding method, whereby the film is molded adhering to the inner surface of the drum part. In addition, since the release agent or alternatively, the film having no affinity with the resin constituting the ear part, is previously positioned between the synthetic resin film of the ear forming part and the drum part, the ear does not to adhere to the drum part, but can be made to extend therefrom, Instead of the manufacturing process described above, the synthetic film may be welded to the kerf perimeter of the inner surface of the drum part by a heat-seal process.

DETAILED DESCRIPTION OF THE PREFERRED EMBODIMENTS

The present invention will now be described in detail with reference to the preferred embodiments thereof, taken in connection with the accompanying drawings.

Figure 1:
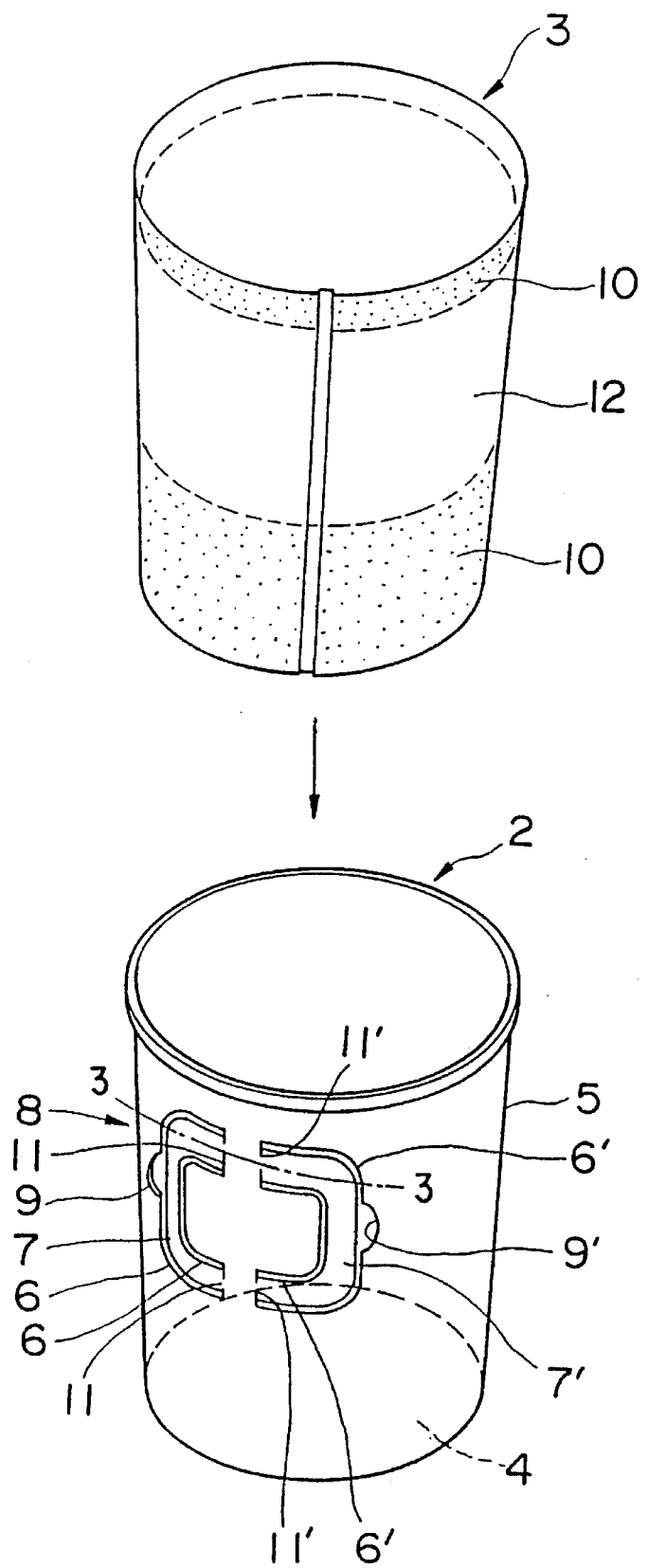
FIG. 1 is an exploded cross-sectional view of a container according to a first embodiment of the present invention.
Figure 2:
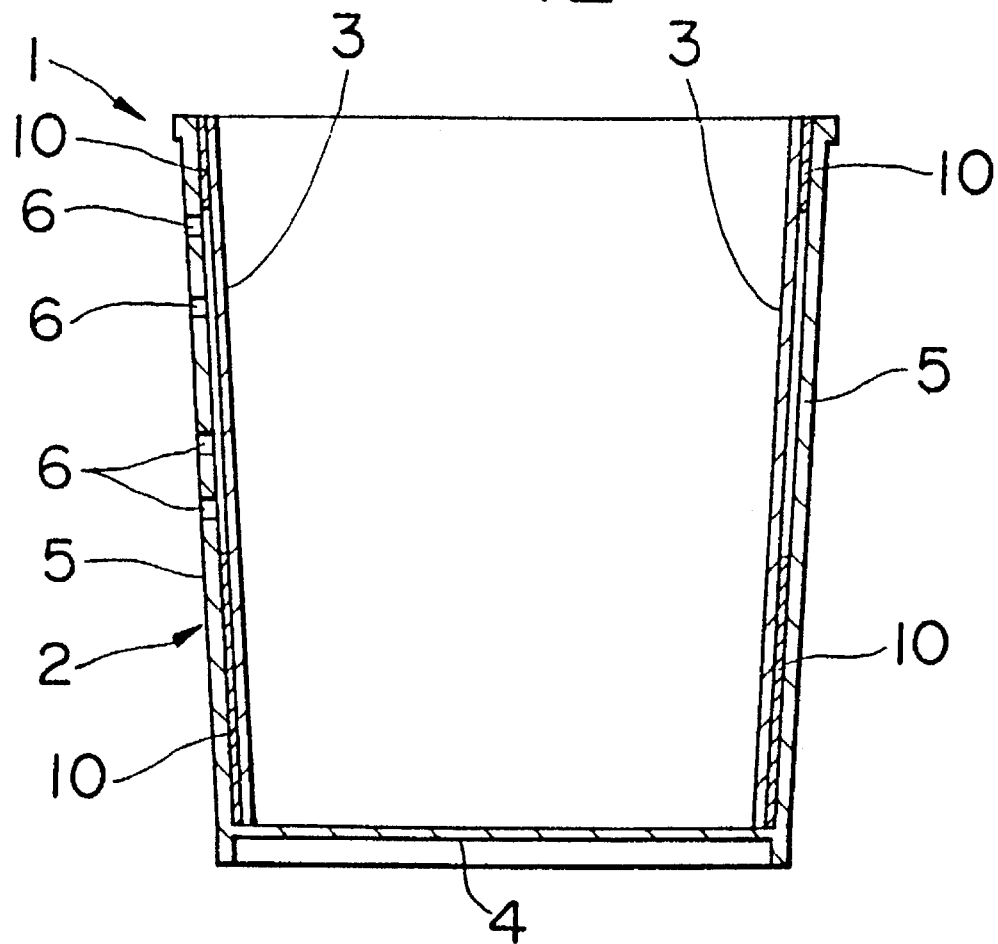
FIG. 2 is a longitudinal sectional view of the first embodiment.
Figure 3:
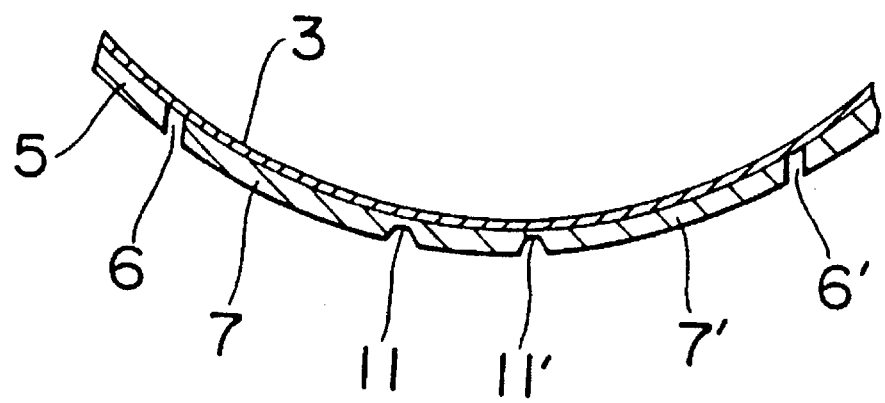
FIG. 3 is a sectional view along 3—3 illustrated in FIG. 1.

In this embodiment, a container 1 includes a container main body 2 and a synthetic resin film 3 covering over the inner surface of the container main body 2, as shown in FIG. 1. The container main body 2 includes a circular bottom part 4 and a cylindrical drum part 5, which extends up from the peripheral edge of the bottom part 4 and forms an opening on the top of the drum part 5.

Ears 7 and 7' are divided and formed by grooves or kerfs 6 and 6' in the rear surface of the drum part 5. Two kerfs 6 define ear 7. The kerfs 6 are parallel each other and C-shaped. One kerf 6' is larger than the other. The two kerfs 6' and 6' are reverse C-shaped while one kerf 6 is larger than the other. Kerfs 6' are oriented in horizontal symmetry to the kerfs 6 and 6, so a pair of the ears 7 and 7' are formed. A pair of semicircular-shaped notches 9 and 9' are provided at a longitudinal center part on the outside of the kerfs 6 and 6' respectively. The notches 9 and 9' are provided for a user to insert fingers to extend the pair of ears 7 and 7'.

Thin folding lines 11 and 11' are provided on the base part of the each of the ears 7 and 7'. Thin folding lines 11 and 11' are provided at a position to link ends of the C-shaped kerfs 6 or the kerfs 6'.

A synthetic resin film 3 is adhered to the inner surface of the drum part 5 of the container main body 2. Film 3 covers ear forming region or part 8, including the ears 7 and 7', the kerfs 6 and 6' and the notches 9 and 9' in a liquid tight manner. Consequently, it is impossible for liquid contents to leak from the container main body 2 through the kerfs 6 or 6'. Moreover, the inner surface of the film is not adhered to either the inner surface of the ear 7 or that of the ear 7' in the region of the ear forming part 8. Thus, the ears 7 and 7' can be extended.

In FIG. 1, adhesive layers 10 are coated onto the outer circumference of the top end part and the outer circumstances of the lower part of the cylindrical synthetic resin film 3. A non-adhesive part 12 is provided between the two adhesive layers 10. When the cylindrical synthetic resin film 3 is adhered to the inside of the drum part 5, the synthetic resin film 3 is adhered to the inner surface of the drum part 5 by the adhesive layers 10. The synthetic resin film 3 does not adhere to non-adhesive region 12 corresponding to the ear forming part 8. Therefore, each of the ears 7 and 7' does not stick to the film 3.

Manufacturing methods for the container according to the first embodiment will be explained below with reference to FIGS. 4 to 8.

Figure 4:
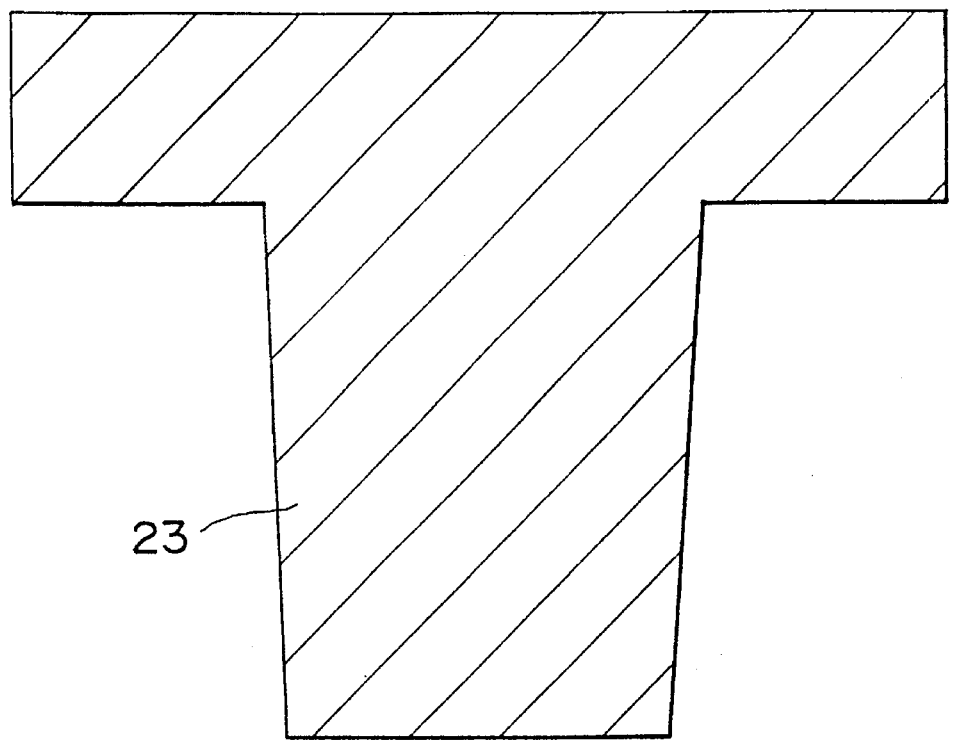
FIG. 4 is a sectional view of a container molding die according to the present invention.
Figure 4:
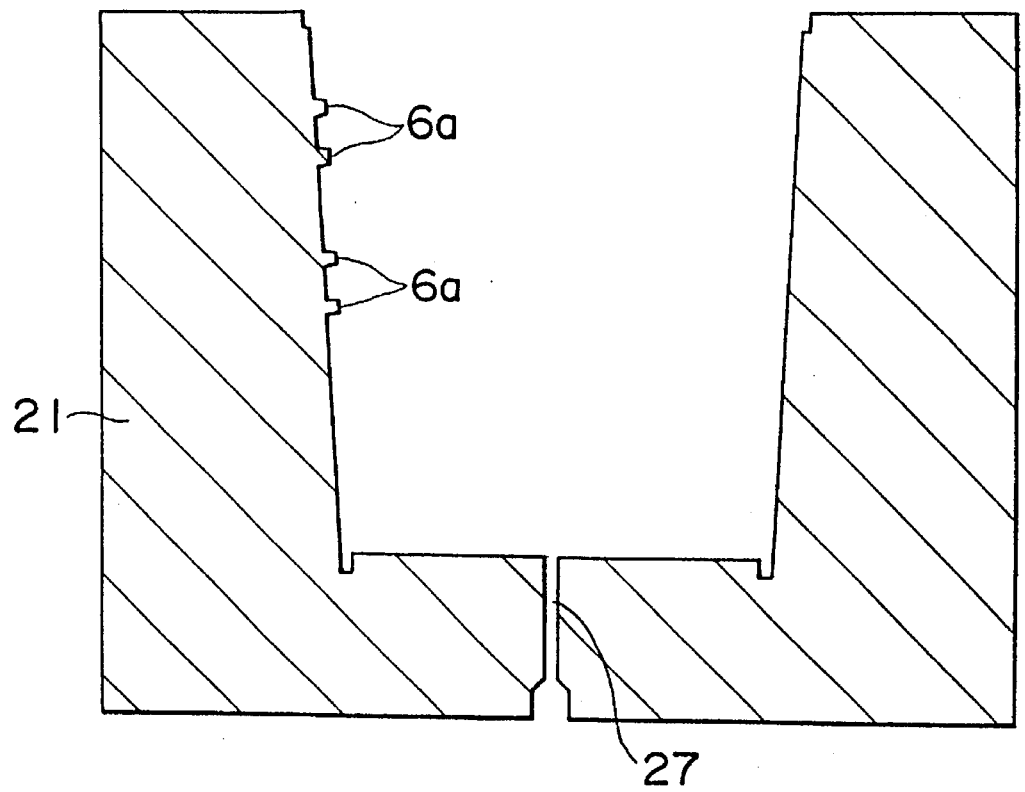
Figure 6:
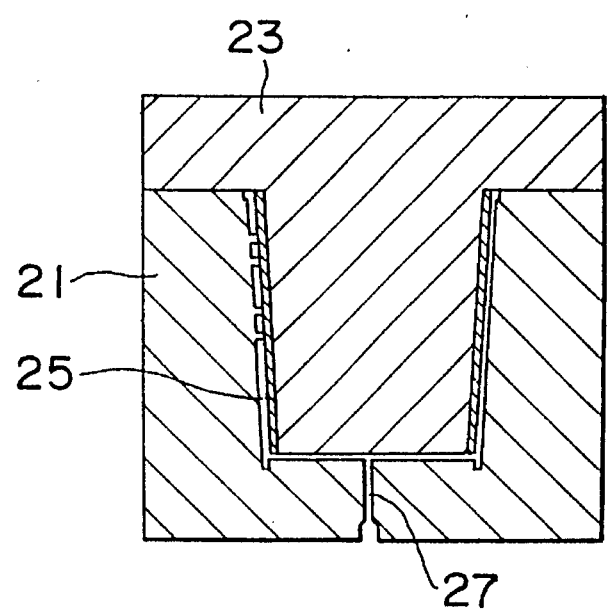
FIG. 6 is a drawing showing a molding method for the container according to the present invention.

The method explained hereinafter uses the insertion molding process. First, a die illustrated in FIG. 4 is provided. The die includes a female mold 21 having an inner surface corresponding to an outline shape of the container and a male mold 23 which can be inserted into the female mold 21. Male mold 23 and female mold 21 are fitted together so a container molding cavity 25 is formed therebetween, as shown in FIG. 6. Moreover, a port or gate 27, for supplying a molten resin into the cavity 25, is provided in the female mold 21. Projections 6a are also provided on the inner wall face of the female mold 21 in order to form the kerfs 6 and 6'.

Separate from the die, a cylindrical synthetic resin film 3, as shown in FIG. 1, is provided. This cylindrical synthetic resin film 3, can be molded cylindrically by rolling a flat film, superimposing both ends thereof and then adhering these ends by heating-sealing or the like. Alternatively, the film 3 may be extruded from an extrusion die having a circular extruding port.

The periphery of the cylindrical synthetic resin film 3 is coated with an adhesive layer in advance as shown in FIG. 1.

Figure 5:
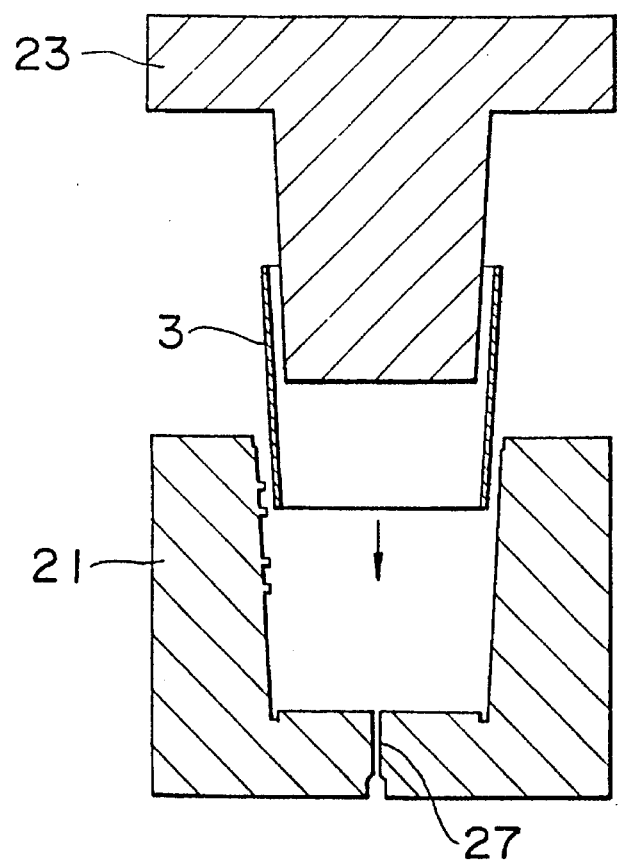
FIG. 5 is a drawing showing a molding method for a container according to the present invention.

Next, the male mold 23 and the female mold 21 are separated and then the cylindrical synthetic resin film 3 is located into the female mold 21. Alternatively, the film 3 may be loaded onto the periphery of the male mold 23, as shown in FIG. 5.

Figure 7:
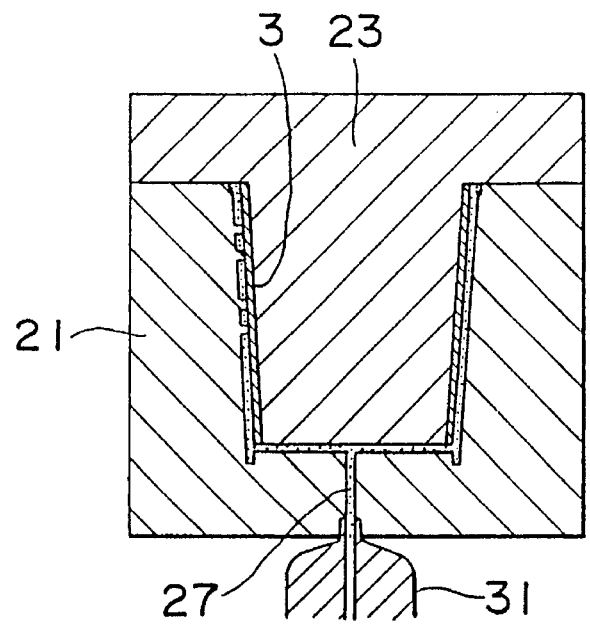
FIG. 7 is a drawing showing a molding method for the container according to the present invention.

Next, the male mold 23 and the female mold 21 are brought together and closed, as shown in FIG. 6. Molten resin is extruded into the cavity 25 through a nozzle 31 of an injection molding machine, as shown in FIG. 7.

Figure 8:
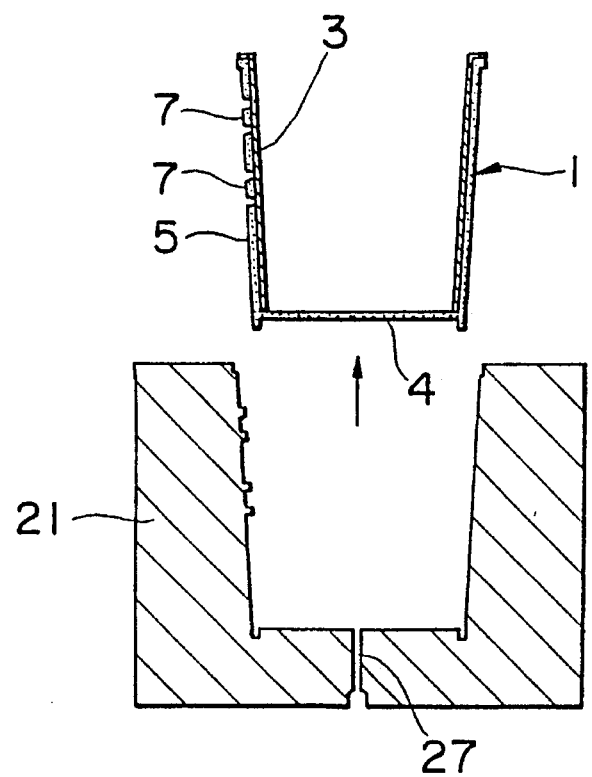
FIG. 8 is a drawing showing a molding method for the container according to the present invention.

After the resulting molded product has cooled, the die is opened to permit the molded product or a molded container to be taken out, as shown in FIG. 8.

In this embodiment, the material of the container main body 2 is preferably polypropylene. The synthetic resin film 3 is preferably polyethylene terephthalate, which is a different material than the container main body 2. The material of the film has no affinity with the polypropylene of the body 2 and the material of the adhesive layer 10.

When the container main body 2 is injection-molded, the adhesive resin layer 10 will melt. Therefore, the synthetic resin film 3 will be integral and one piece with the container main body 2.

According to this embodiment, the synthetic resin film 3 has an advantage that the film 3 can be easily positioned when being fixed. Further, in this embodiment, when the synthetic resin film 3 includes an adhesive synthetic resin, which has an affinity with the resin of the drum part 5, the container can include a coated release agent on the region 12 corresponding to the ear forming part 8. The above-described adhesive layer 10 is not required.

Figure 9:
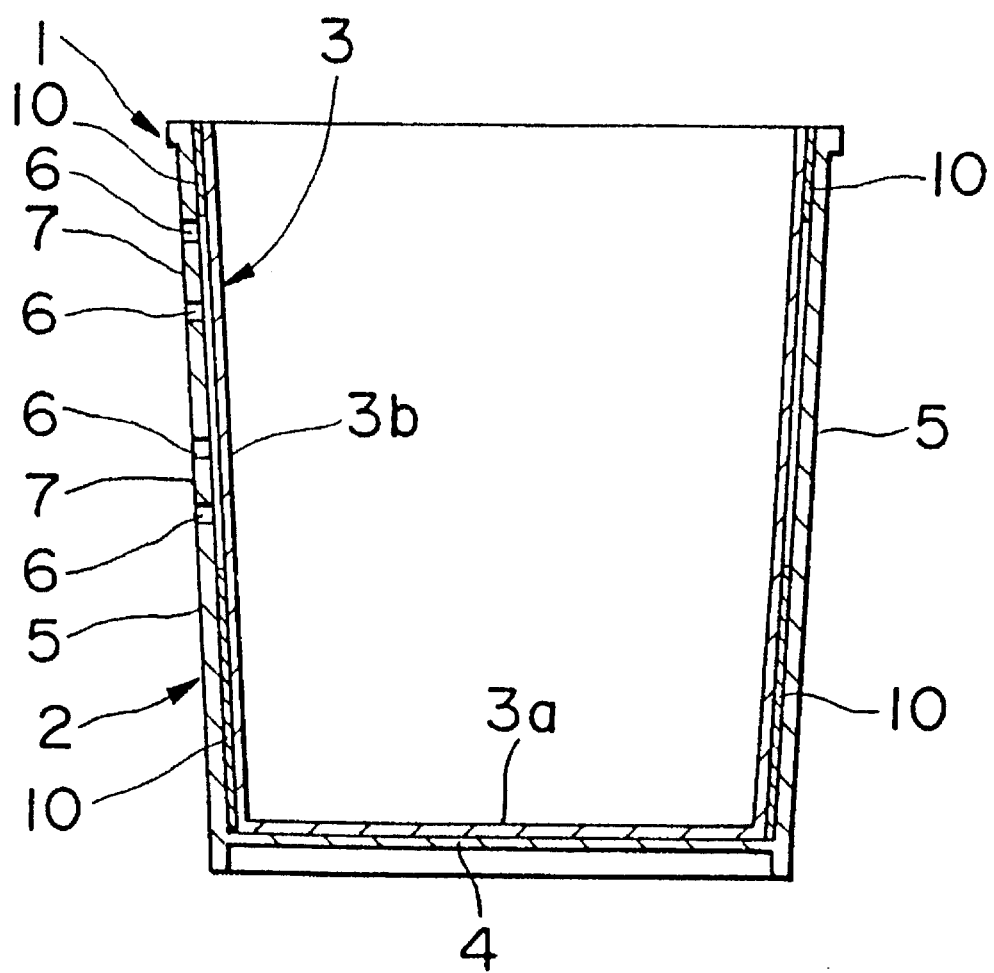
FIG. 9 is a longitudinal sectional view showing a second embodiment of the present invention.
Figure 11:
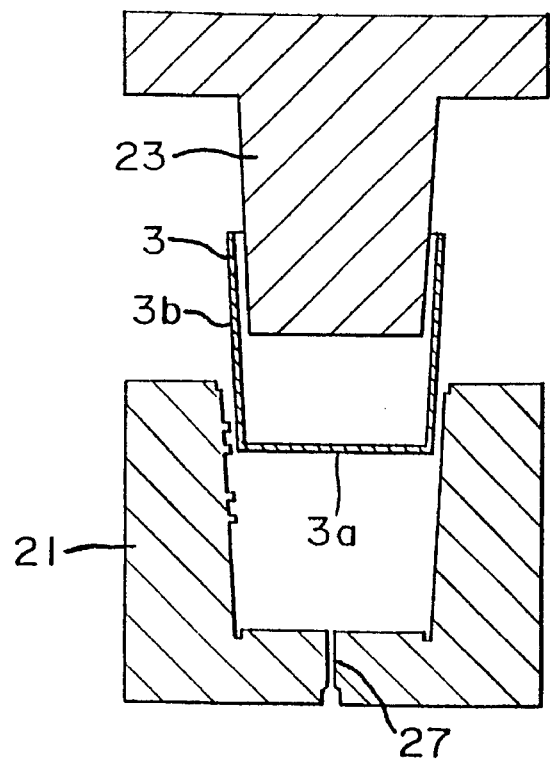
FIG. 11 is a drawing showing a molding method for the second and the third embodiments according to the present invention.
Figure 12:
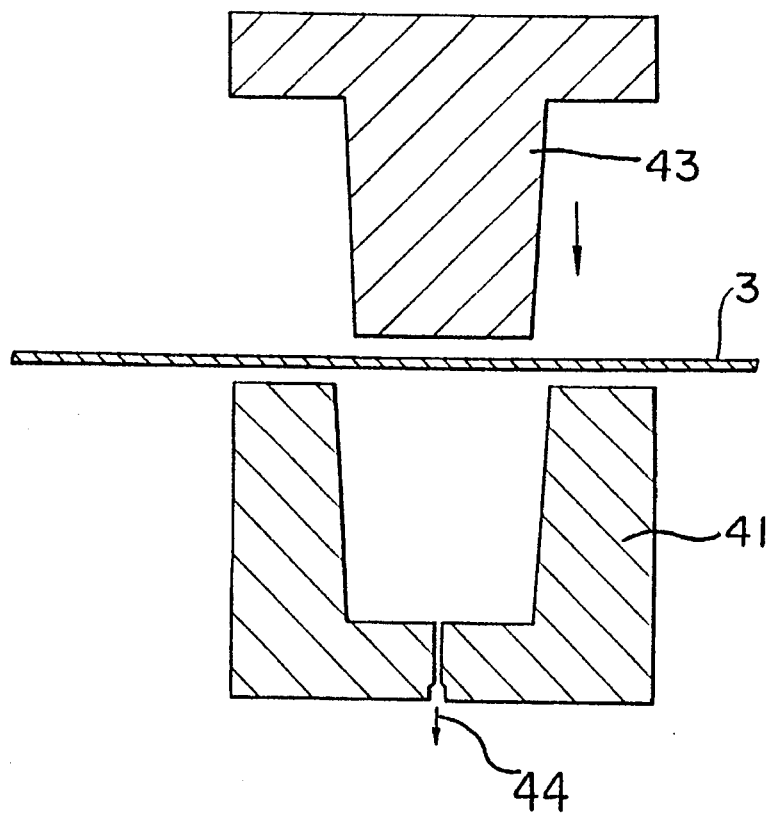
FIG. 12 is a sectional view showing a thermo-form method for molding a synthetic resin film into a cylindrical and bottomed shape, used in the second and the third embodiments of the present invention.

A second embodiment according to the present invention will be explained with reference to FIGS. 9, 11 and 12. In this embodiment, a synthetic resin film 3 is loaded into the container main body 2, which is molded to be cylindrical. The body also has a bottom. The synthetic resin film 3 includes a circular bottom part film 3a and a drum part film 3b, which extends up from the periphery of the bottom part film 3a. The bottom part film 3a is loaded onto an inner surface of the bottom part of the container main body 2. The drum part film 3b is loaded onto the inner surface of the drum part of the same container main body 2.

The synthetic resin film 3 is cylindrical in shape and is molded by a thermo-form method. As shown in FIG. 12, a thermo-form molding die has a female mold 41 for forming a concave part in the shape of a cylindrically bottomed container. A male mold 43 forms a convex part of the container. Then, a flat pre-heated synthetic resin film is laid onto the top surface of the female mold 41. The male mold is fitted to the female mold, while the film is pressed by the male mold. The inside of the female mold is negatively pressurized by air suction through a suction path 44 provided on the female mold 41. The pressure allows the film to adhere to the inner surface of the die. Alternatively, compressed air is supplied to the top surface of the film through a compression air path (not shown) provided in the male mold 43. Thus, the film forming body is cylindrical in shape and has a bottom. The film forming body can be loaded into the container molding die, as shown in FIG. 11, so a container, as illustrated in FIG. 9, is molded by the process explained in the first embodiment with reference to FIGS. 5–8.

As long as a synthetic resin film, which has a cylindrical shape and a bottom is used, leakage of liquid can be avoided, regardless of the liquid-tightness of the kerfs 6.

Figure 10:
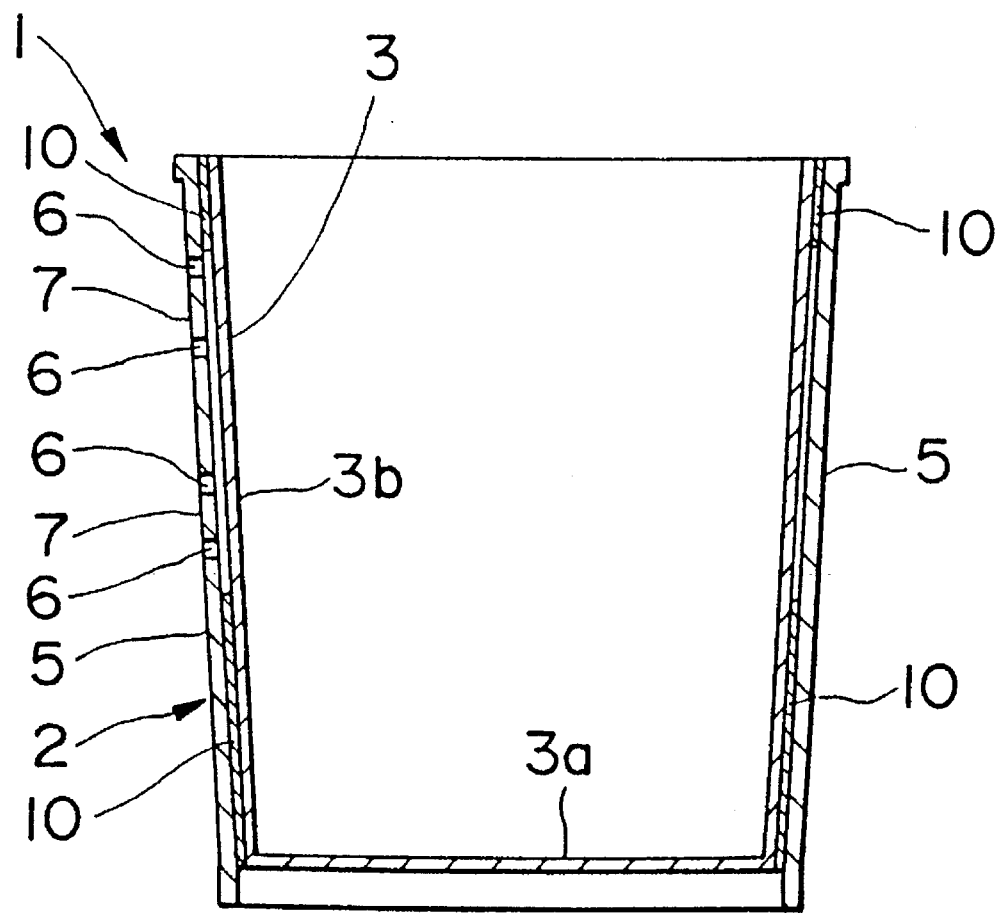
FIG. 10 is a longitudinal sectional view showing a third embodiment of the present invention.

A third embodiment of the present invention will be described with reference to FIGS. 10, 11 and 12. The container of this embodiment has the same structure as in FIG. 9, except that the bottom part 4 of the container main body is omitted. In order to contain contents, the bottom part of the synthetic resin film 3a is also used as the bottom part of a container.

Because the other aspects of this embodiment are the same as the second embodiment, further explanations are omitted.

Figure 13:
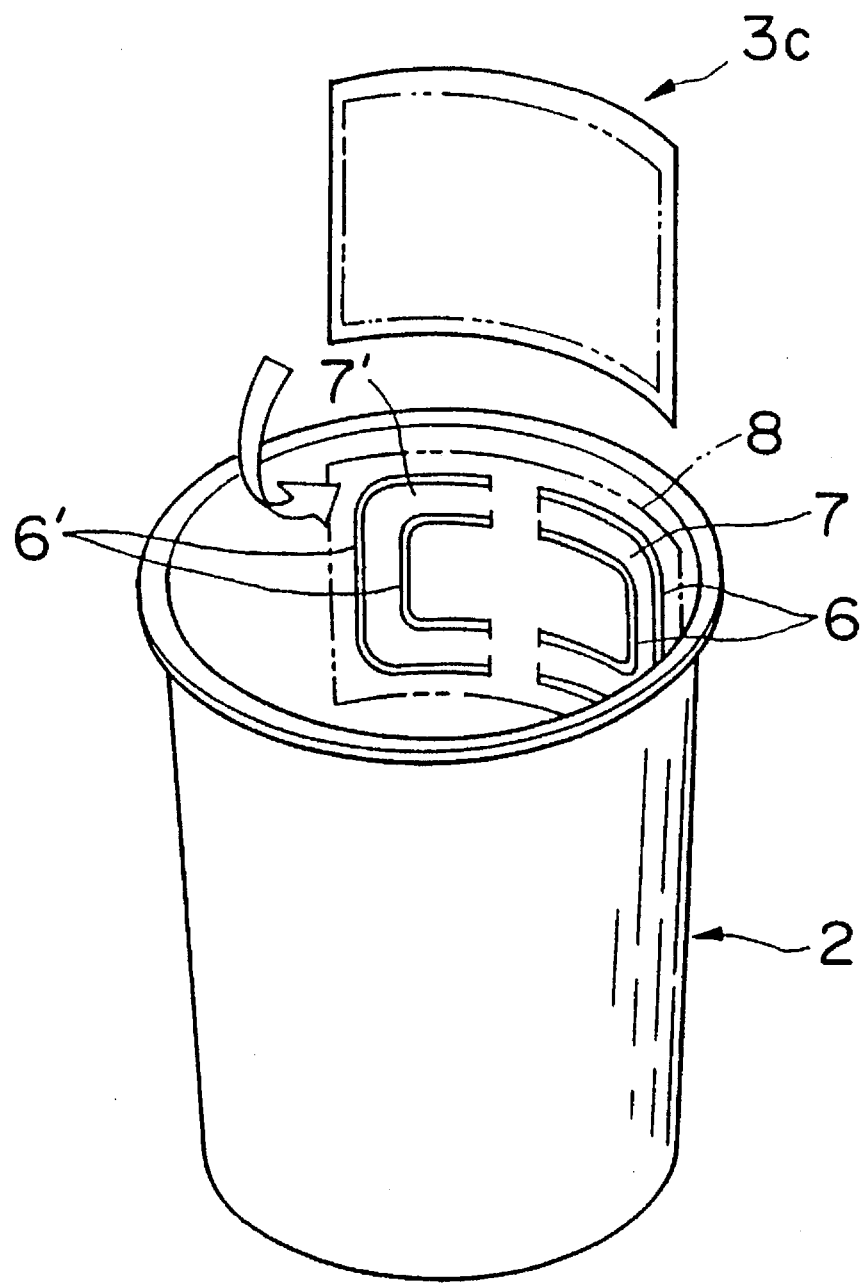
FIG. 13 is an exploded cross-sectional view showing a fourth embodiment of the present invention.

A fourth embodiment of the present invention will be described with reference to FIG. 13. In this embodiment, the synthetic resin film has a minimal size. Film 3c has a size partially covering the ear forming part 8, as shown in FIG. 13. The film 3b surrounding the ear forming part 8 is adhered to the outside of the kerfs 6 and 6' on the inner surface of the drum part 5 of the container main body 2.

In this embodiment, methods for adhering the film 3c include not only melt-adhering the adhesive layer in accordance with the insertion molding process, but also heat-sealing or ultrasonic-welding of the surrounding part of the film to the drum part 5. Alternatively, an adhesive can be used to adhere the film 3c.

In this embodiment, the manufacturing cost of the container can be reduced because only a flat film is used. There is no molding of the film into a cylindrical shape or a cylindrical shape with a bottom, as explained in the above embodiments.

Figure 14:
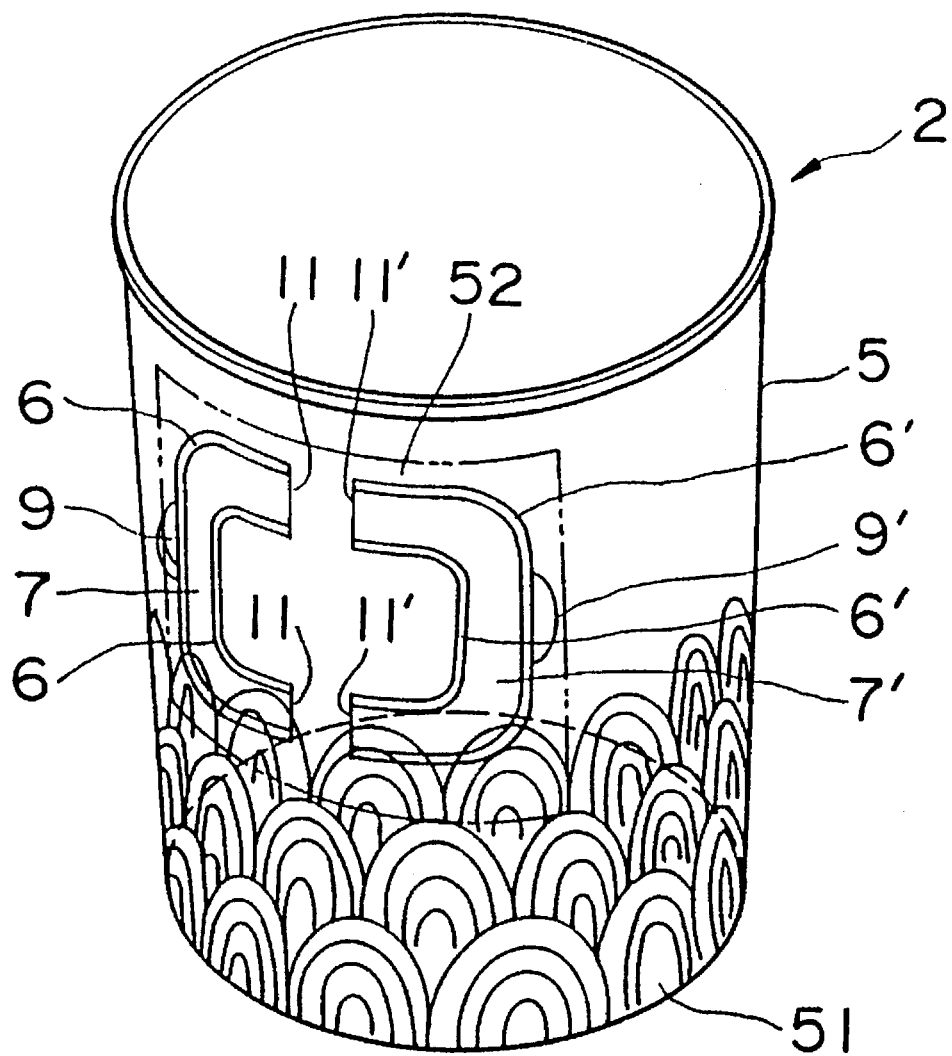
FIG. 14 is a perspective view showing a fifth embodiment of the present invention.
Figure 15:
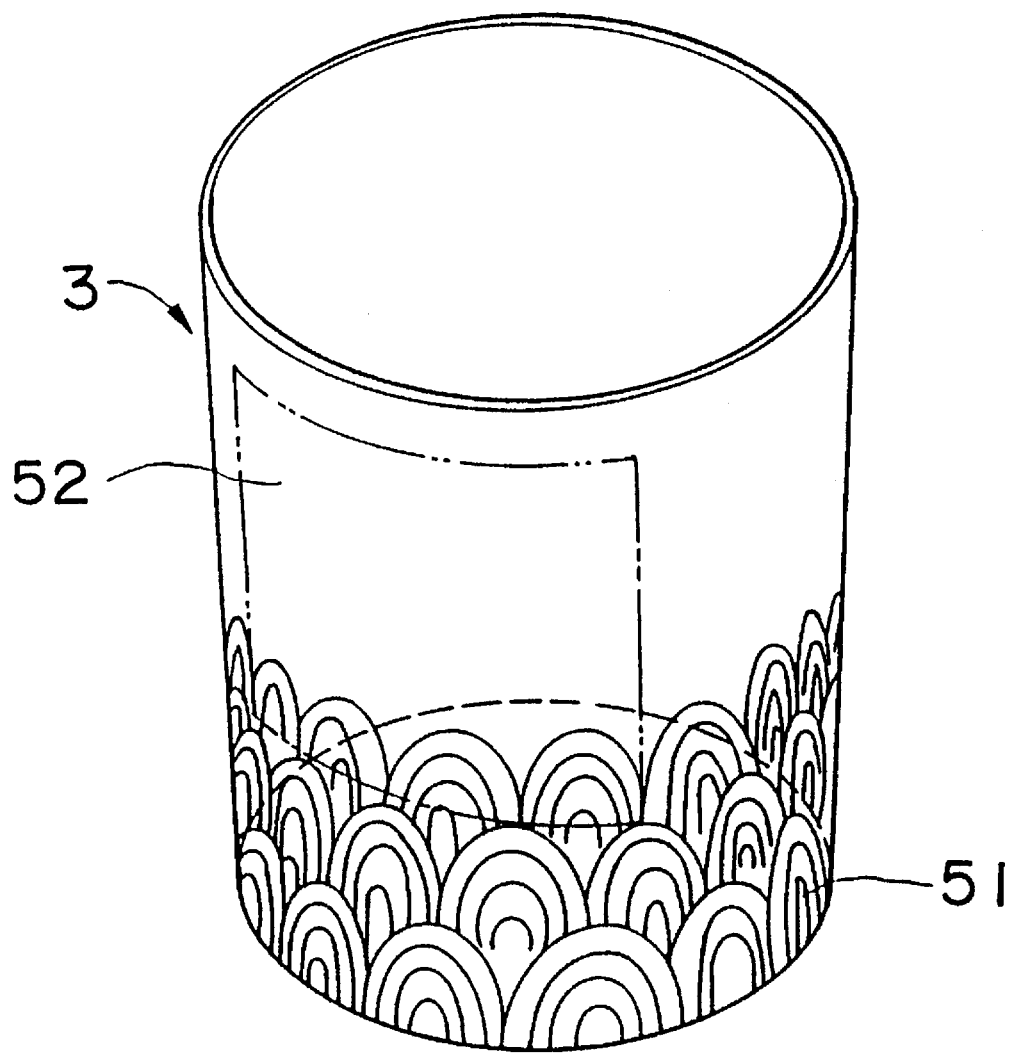
FIG. 15 is a perspective view showing a cylindrical synthetic resin film that is used in the fifth embodiment.

A fifth embodiment will be described with reference to FIGS. 14 and 15. In this embodiment, the container main body 2 and the cylindrical synthetic resin film 3 are provided on the container main body 2. The container main body 2 is made of a transparent synthetic resin, for example polypropylene.

The synthetic resin film 3 on the container main body is formed by laminating an inner layer film, an intermediate or center layer film and an outer layer film, all of which are transparent. The center layer film has a desired pattern 51, which is applied to the center layer film by printing before the laminating.

The outer later film of the synthetic resin film 3 includes a resin, which has an affinity to the container main body 2. The resin is a resin having similar properties as the container main body 2, i.e., polypropylene. Other olefinic resins may also be used.

An ink 52, containing a release agent, is printed on the outer film layer. The ink 52 is printed at a region of the outer layer film corresponding to the ear forming part 8 on the outer surface near the top part, as shown in FIG. 15.

Because other aspects are the same as the first embodiment, except that the adhesive layer 10 is not formed by a coating process, the same reference numerals are used and further explanation will be omitted.

The molding method for the container according to this embodiment is the insertion molding method as explained in the first embodiment. In this embodiment, since the outer layer film is made of polypropylene, it will be adhered by an injected molten resin to be unified with the drum part 5.

The ears 7 and 7' are formed at a position which corresponds to the region wherein the ink 52 is printed. Therefore, the ears 7 and 7' do not adhere to the film.

When the container with an ear is in use, the pair of the C-shaped ears 7 and 7' are raised from the surface of the container by extending fingertips through a concave notch 9. The notch 9 is positioned at each of a cardinal point to the thin folding lines 11 and 11'. The notches 9 permit the ears 7 and 7' to be projected outwardly from the drum part 5.

In this embodiment, each of the ears 7 and 7' correspond to the region printed with the ink 52 containing a release agent. The ears 7 and 7' do not adhere to the film 3, so they can be raised up and be projected outwardly with ease. Also, the pattern 51 is printed beforehand on the synthetic resin film 3. The container main body 2 can be easily patterned using an injection resin made of a transparent material.

Further, the synthetic resin film 3 is not required to be formed of three layers as explained in this embodiment. The film 3 can be formed by printing a pattern on a part of an outer surface of one layer film, coating an ink 52, containing a release agent, on a region which corresponds to the ear forming part 8, and then coating an adhesive layer on the other part of the outer surface, as explained in the first embodiment.

Further, the synthetic resin film 3 may be formed of two layers, consisting of an inner and an outer layers. A pattern can be printed on the outer surface of the inner layer or on the inner surface of the outer layer so as to be positioned between these two layers.

In addition, the synthetic resin film 3 having a cylindrical and bottomed shape, as described in the second and the third embodiments, can be used in this embodiment.

In this embodiment, when the outer film is formed of a resin having no affinity with the container main body 2, it is not necessary to coat an ink 52, containing a release agent, over the region corresponding to the ear forming part 8. One can coat and form the adhesive layer according to the first embodiment on the other part. An intervention film 61 made of non-adhesive resin having no affinity with the resin of the drum part may be used, as shown in the FIGS. 16 and 18. Use of film 61 takes the place of an ink containing a release agent.

Figure 16:
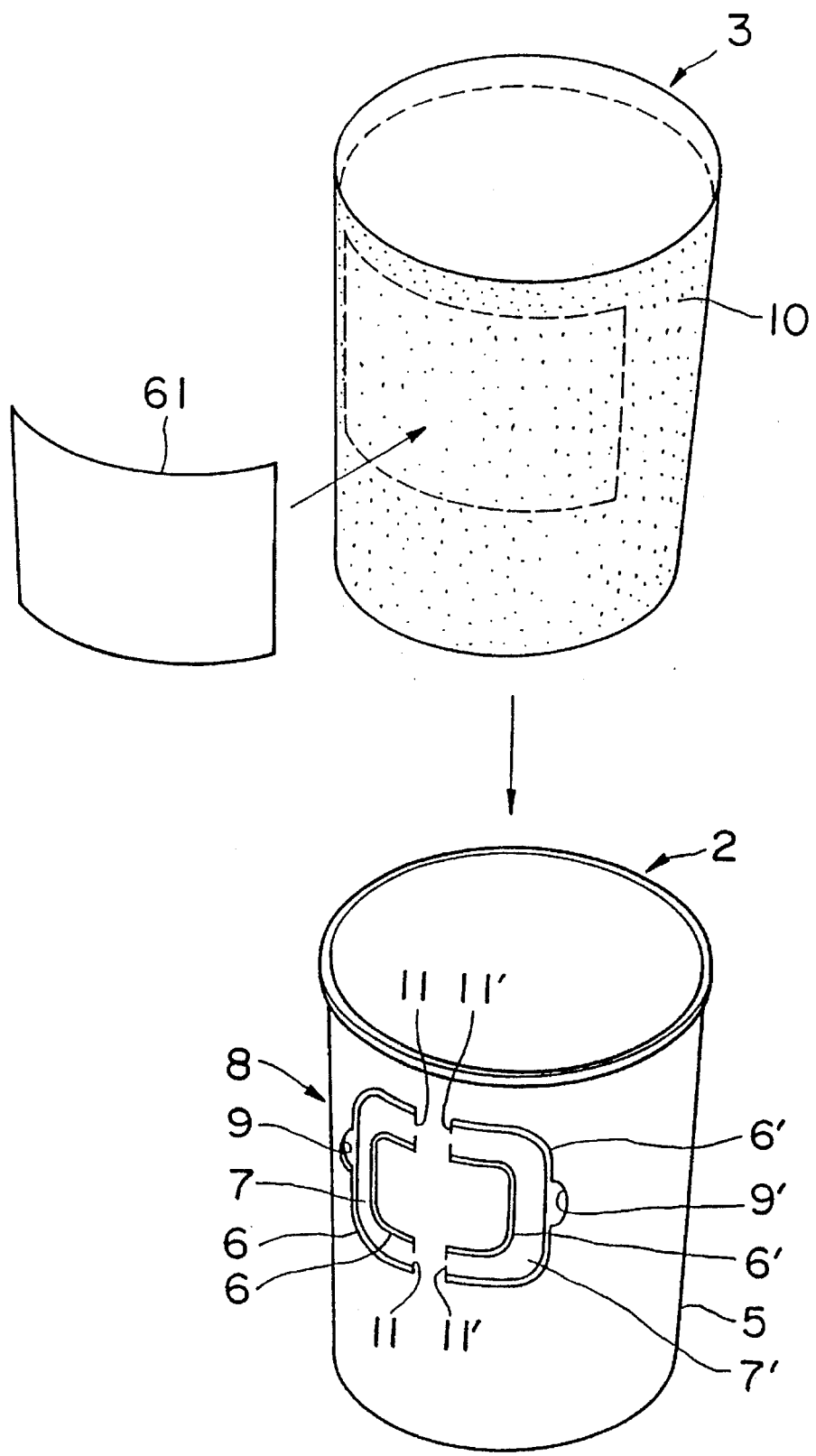
FIG. 16 is an exploded cross-sectional view showing a sixth embodiment of the present invention.

A sixth embodiment will be explained with reference to FIG. 16. The embodiment, shown in FIG. 16 has in addition to the structure of the first embodiment, the following features. An adhesive layer is coated on the outer surface of the cylindrical synthetic resin film 3. An intervention film 61 includes a non-adhesive resin and has no affinity with the resin of the container main body 2. The intervention film 61 is adhered to the region corresponding to the ear forming part 8 on the outer surface of the synthetic resin film 3.

Figure 18:
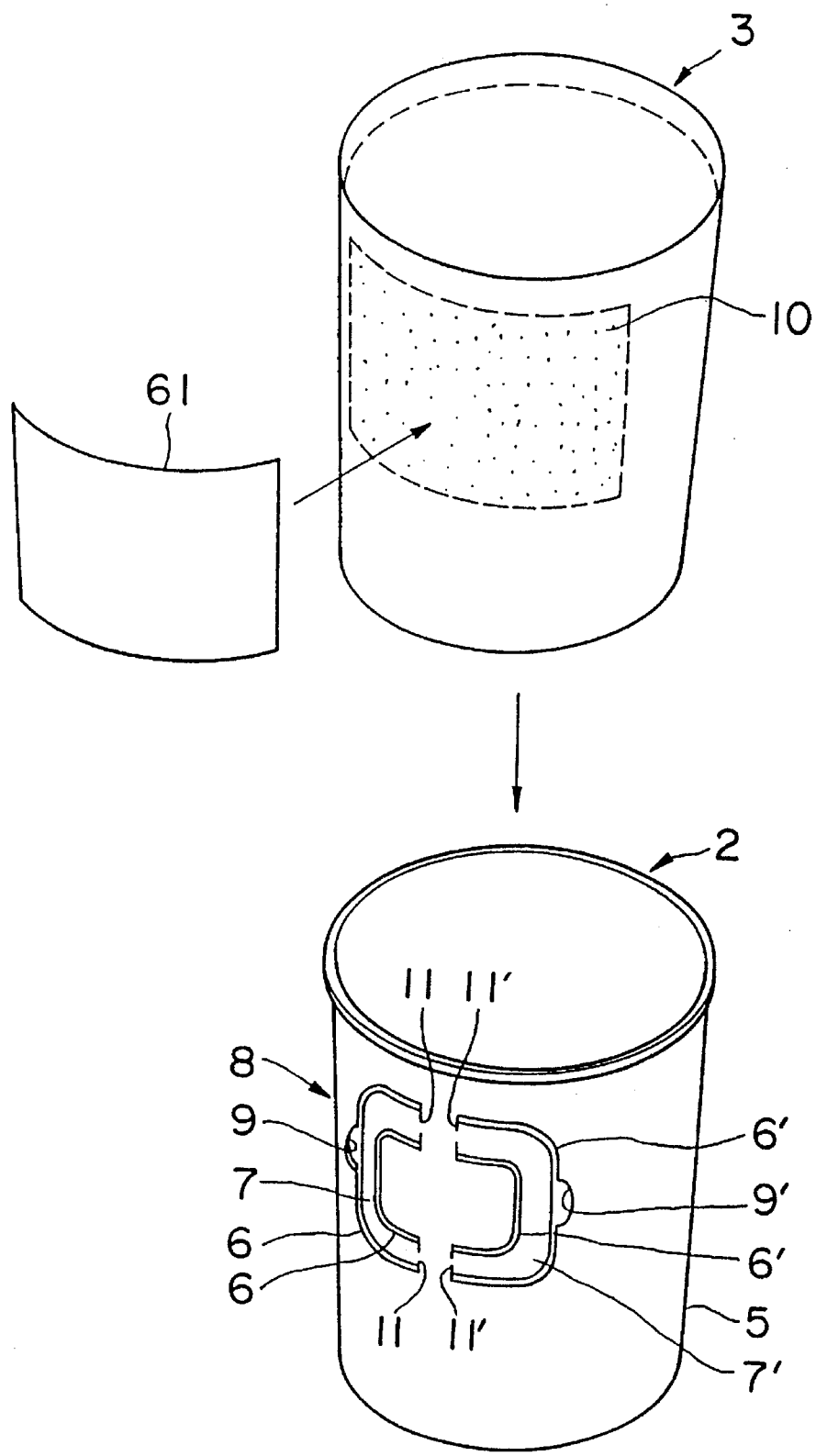
FIG. 18 is an exploded cross view showing one of various examples according to the sixth embodiment of the present invention.

A container having the intervention film 61 between the ears 7 and 7' and the synthetic resin film 3 can be molded by insert-molding a synthetic resin film 3 having the intervention film 61 by the same molding method as in the above-embodiments. In this embodiment, the ears 7 and 7' correspond to the resin intervention film 61, with no affinity with the resin forming the container main body. The ears 7 and 7' can be detached from the intervention film 61 to be raised up and projected outwardly with ease. The concepts of this embodiment are also applicable to the second and the third embodiments. Moreover, the adhesive layer 10 can be omitted at the ear forming part region 8, except at the intervention film adhering part as shown in FIG. 18. This is achieved by making the synthetic resin film 3 with an adhesive synthetic resin having an affinity with the resin of the drum part.

Figure 17A:
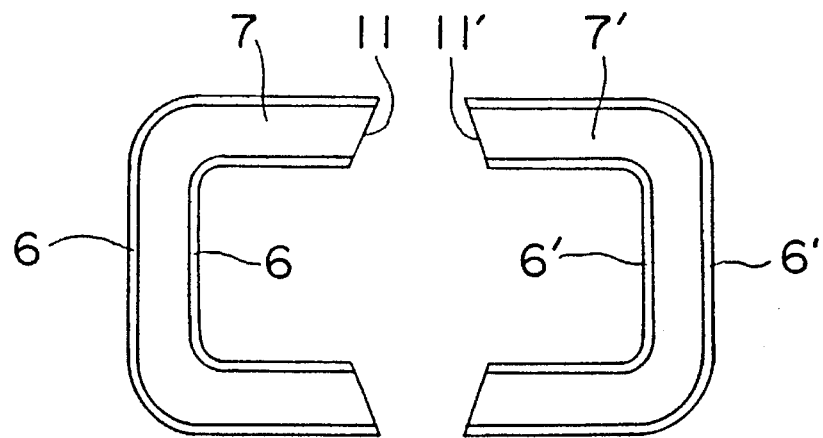
FIGS. 17A–17C are views showing various examples of thin folding lines of the ears according to the present invention.
Figure 17B:
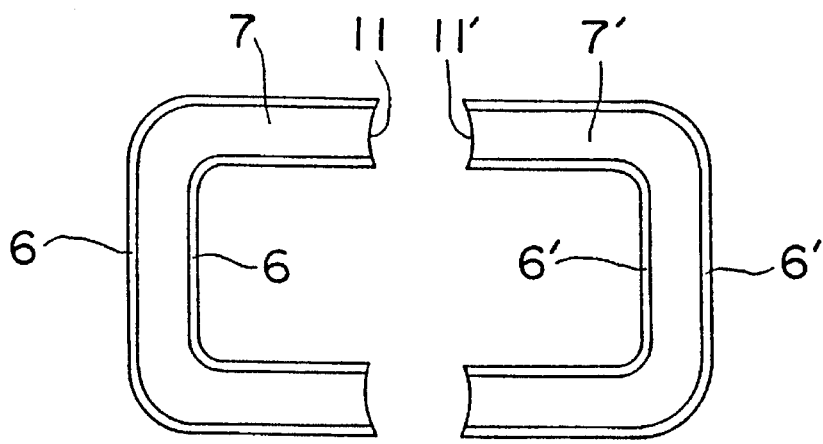
Figure 17C:
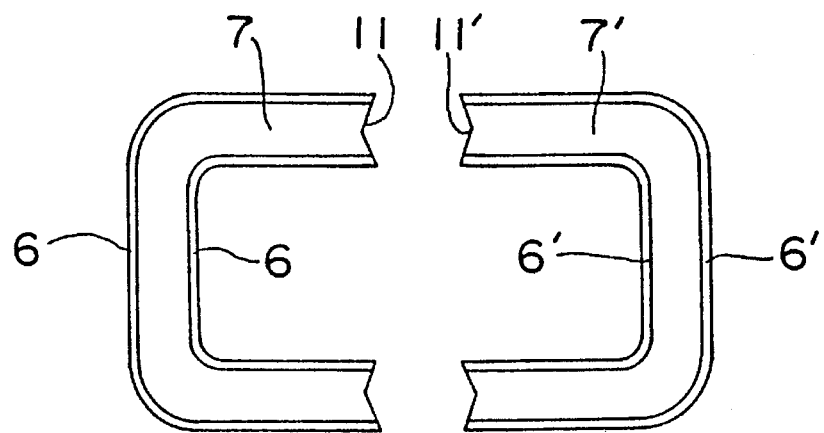

Various modifications according to the present invention can be realized as follows. For example, it is possible for the ears 7 and 7' to turn or cam over, in order not to return to the original position when the ears are extended. The ears 7 and 7' can cross a fixed dead point. The dead point may be formed by inclining the thin folding lines 11 and 11' toward the center axis of the container drum part 5 as shown in FIG. 17(A). Alternatively, the dead point may be formed providing the lines 11 and 11' in a circular arc shape as shown in FIG. 7(B). Further, the dead point may be provided by forming an interior angle of the lines 11 and 11' in a triangular obtuse angle as shown in FIG. 17(C). Consequently, the ears do not return to the drum part 5 side if the user lets go of them. Therefore, it is easy to re-grasp them.

In the above embodiments, a pair of ears 7 and 7' is provided horizontal and symmetrically. However, the pair of ears 7 and 7' can be provide vertical and symmetrically. Further, it is also possible to provide only one ear. The pair of ears 7 and 7' can be divided and formed at the double C-shaped kerfs 6. Moreover, the pair of ears 7 and 7' can also be divided and formed on the inside of one of the C-shaped kerfs 6.

It is possible to use any thermoplastic resin for the container main body 2 or the synthetic resin film 3 in the present invention. It is also possible to use a foaming resin to make up the container main body 3.

As described above, the container 1 according to the above embodiments can be efficiently stacked and piled. The container is not bulky in manufacturing, in transportation, or in storing, because the ears 7 and 7' are formed as a part of the drum part 5 of the container main body 2, and do not project outwardly when not in use. In addition, since the ears 7 and 7' and the container main body 2 are molded together, costs of manufacturing is reduced.

The container 1 having the ears 7 and 7' according to the present invention is simple to use. The ears 7 and 7' are merely raised up outwardly. The container 1 with the ears 7 and 7' is very handy, easy and convenient to use.

Containers of this kind can also be used as a container for instant noodles, instant coffee or for any kind of drinks. Further, the containers can be piled and stored in an automatic vending machine. The containers are also very useful as a disposable container for a picnic.

I claim:

1. A container having at least one ear, the container comprising:

a bottom part having a periphery;

a drum part extending upwardly from the periphery of the bottom part and having an ear forming region;

at least one ear on the drum part, the at least one ear being formed on the drum part at the ear forming region and divided from the drum part by a kerf, the at least one ear integrally formed and in one piece with the drum part, the at least one ear extendible from the drum part; and a synthetic resin film adhered to the drum part, the synthetic resin film adhering to an converting at least a region of an inner surface of the drum part corresponding to the ear forming region and the kerf in a liquid-tight manner.

2. The container according to claim 1, including a thin folding line formed at a boundary between the at least one ear and the drum part.

3. The container according to claims 2, wherein the thin folding line inclines to a center axis of the drum part.

4. The container according to claim 2, wherein the thin folding line is essentially in the shape of a circular arc.

5. The container according to claim 2, wherein the thin folding line is formed by two sides of a triangle, wherein an interior angle formed by the two sides is an obtuse angle.

6. A container according to claim 1, wherein the bottom part and the drum part are integrally molded in one piece to form a container main body.

7. The container according to claim 6, wherein said synthetic resin film is a cylindrical film, the cylindrical film covering the inner surface of the drum part, the synthetic resin film including a bottom and a top having an opening at a top.

8. The container according to claim 6, wherein the synthetic resin film includes a bottom part film covering an inner surface of the bottom part and a drum part film extending from a periphery of the bottom part film to cover the inner surface of the drum part, the synthetic resin film cylindrically formed with a bottom and a top having an opening.

9. The container according to claim 1, wherein the drum part has a drum top is cylindrical with openings at the drum top and the bottom part to constitute a container main body, and the synthetic resin film includes a bottom part film constituting a bottom of the container and a drum part film extending from the periphery of the bottom part film, the synthetic resin film covers the inner surface of the drum part and is formed with a top having an opening.

10. The container according to claim 1, wherein the synthetic resin film is cylindrical, a pattern is printed on the periphery of the synthetic resin film, said drum part is formed from a transparent synthetic resin.

11. The container according to claim 10, wherein the synthetic resin film is a multi-layered film, the multi-layered film includes at least an outer layer and an inner layer and further includes the pattern between the outer layer and the inner layer.

12. The container according to claim 11, wherein the multi-layered film includes at least three layered films and the pattern is printed on an intermediate layer of film of the at least three layered films.

13. The container according to claim 11, wherein the outer layer film of the synthetic resin film is formed from a synthetic resin having no affinity with the resin forming the drum part, the outer layer of film includes an adhesive layer except at a part corresponding to the ear forming region so the adhesive layer can adhere the outer layer film to the kerf in a liquid tight manner.

14. The container according to claim 11, including a release agent coated on a part of the outer layer of film corresponding to the ear forming region, wherein the outer layer of film of the synthetic resin film is formed from a synthetic resin having an affinity with the resin constituting the drum part.

15. The container according to claim 11, including an intervention film formed from a resin having no affinity with the resin forming the drum part, wherein the outer layer film of the synthetic resin film is formed from a synthetic resin having an affinity with the resin forming the drum part, the intervention film is adhered to a part of the outer layer film corresponding to the ear forming region.

16. The container according to claim 11, including an adhesive layer able to adhere to the drum part and an intervention film is formed from a resin having no affinity with the resin forming the drum part, wherein the adhesive layer is formed on the outer surface of the outer layer of film of the synthetic resin film, the intervention film is adhered to a part of the outer layer film corresponding to the ear forming region.

17. The container according to claim 1, wherein the synthetic resin film is formed from a resin having no affinity with the resin forming the drum part, the synthetic resin film has an adhesive layer except at a part of the synthetic resin film corresponding to the ear forming region so the adhesive layer adheres the synthetic resin film to the kerf in a liquid tight manner.

18. The container according to claim 1, including a release agent coated on a part of the resin film corresponding to the ear forming region, wherein the synthetic resin film is formed from a synthetic resin having an affinity with the resin forming the drum part.

19. The container according to claim 1, including an intervention film formed from a resin having no affinity with a resin forming the drum part, wherein the synthetic resin film is formed from a synthetic resin having an affinity with the resin forming the drum part, the intervention film adheres to a part of the synthetic resin film corresponding to the ear forming region.

20. The container according to claim 1, including an intervention film formed from a resin having no affinity with the resin forming the drum part and an adhesive layer is able to adhere to the drum part, wherein the adhesive layer is formed on the outer surface of the synthetic resin film, and the intervention film adheres to a part of the synthetic resin film corresponding to the ear forming region.

21. The container according to claim 1, wherein the synthetic resin film adheres to and covers the entire inner surface of the drum part corresponding to the ear forming region and kerf in a liquid-type manner.

* * * * *